United States Patent Office 3,311,223
Patented Mar. 28, 1967

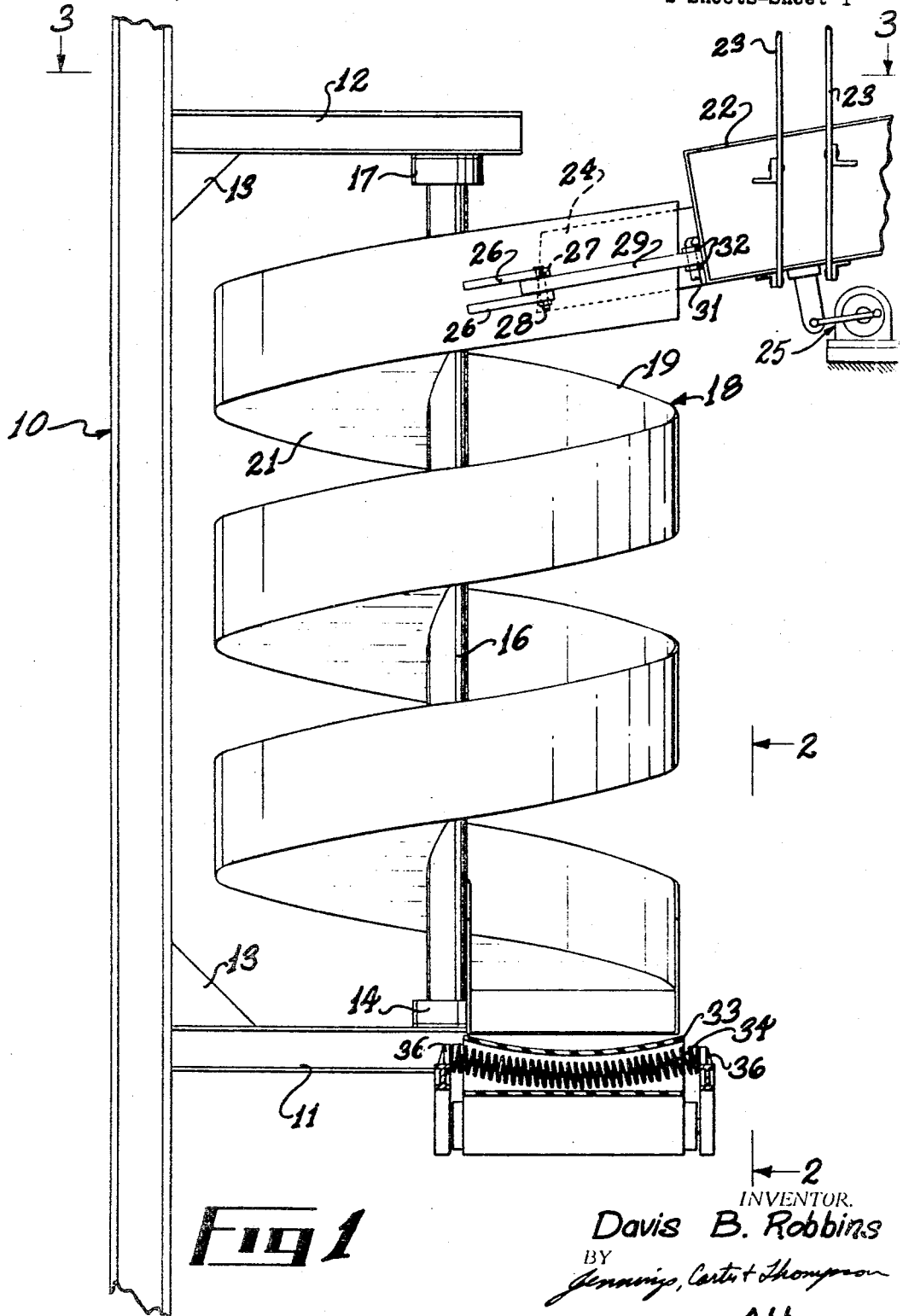

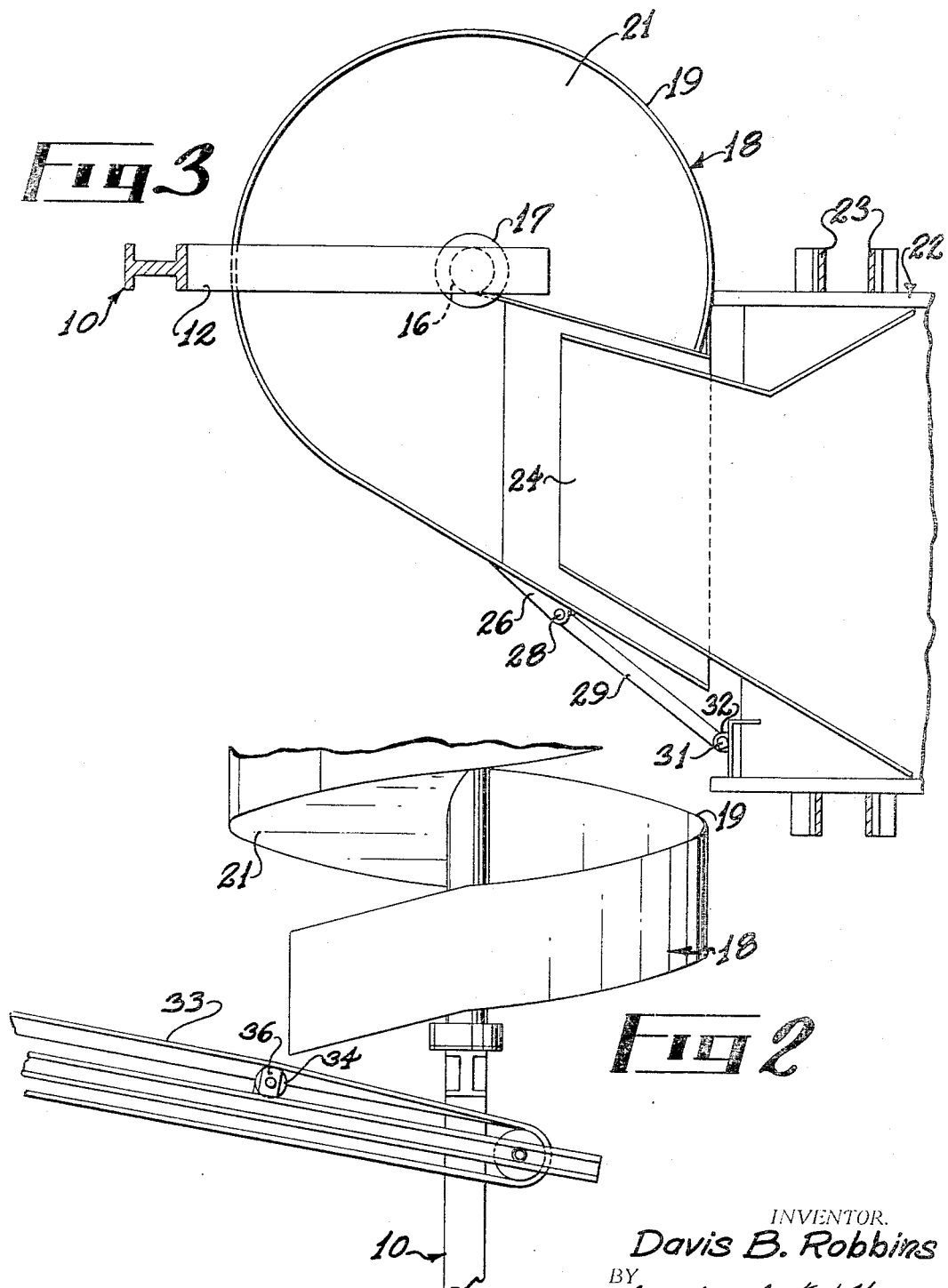

3,311,223
MATERIAL HANDLING APPARATUS
Davis B. Robbins, P.O. Box 2664,
Birmingham, Ala. 35202
Filed Oct. 23, 1965, Ser. No. 503,809
1 Claim. (Cl. 198—220)

This invention relates to material handling apparatus and more particularly to apparatus for transferring materials, such as coal and the like from one elevation to a lower elevation.

An object of my invention is to provide apparatus for transferring materials from one elevation to a lower elevation in a continuous and uniform manner whereby there is no interruption in the flow of materials from the higher elevation to the lower elevation.

A further object of my invention is to provide material handling apparatus of the character designated which shall include improved means for cushioning the fall of the materials as they are discharged at the lower elevation.

A still further object of my invention is to provide material handling apparatus of the character designated which shall be simple of construction, economical of manufacture and one which is compact whereby it requires a minimum of space for the installation and operation thereof.

As is well known in the art to which my invention relates, difficulties have been encountered in the handling of friable materials, such as coal and the like due to the fact that such materials are broken into small particles when they are permitted to fall from one elevation to a lower elevation. While various devices have been devised to transfer materials from one elevation to a lower elevation, such devices are extremely complicated in structure and it is difficult to maintain a uniform and continuous flow of materials through such devices. To overcome the above and other difficulties, I provide a generally vertical support member which is mounted for oscillating movement about a vertical axis. A vertically extending helical conveyor is carried by the support member in position to receive the materials at one elevation and to discharge the materials at a lower elevation. Means is provided to oscillate the helical conveyor in a horizontal plane about the vertical axis of the helical conveyor whereby the materials are conveyed down the helical conveyor to the lower elevation. To further protect the materials being transferred from breakage, I provide cushioning means subjacent the discharging end of the helical conveyor.

Apparatus embodying features of my invention is illustrated in the accompanying drawings, forming a part of this application, in which:

FIG. 1 is a side elevational view, partly broken away and in section;

FIG. 2 is a fragmental view taken generally along the line 2—2 of FIG. 1; and,

FIG. 3 is a sectional view taken generally along the line 3—3 of FIG. 1.

Referring now to the drawings for a better understanding of my invention, I show a supporting frame 10. Secured to and projecting outwardly from the supporting frame 10 are lower and upper supporting brackets 11 and 12, respectively. Suitable gusset plates 13 may be provided between the supporting frame 10 and the support brackets 11 and 12, as shown in FIG. 1.

Mounted on the support bracket 11 is bearing unit 14 which is adapted to support the lower end of a generally vertical support member 16. A bearing unit 17 is carried by the under surface of the support bracket 12 in position to receive the upper end of the support member 16, as shown. By mounting the vertical support member 16 in the bearings 14 and 17, it is adapted for oscillating movement about a vertical axis.

Secured rigidly to the vertical support member 16 is a helical conveyor 18 which comprises a spiral outer wall 19 and a spiral bottom wall 21. The vertically extending member 16 defines the inner wall for the helical conveyor whereby the materials are maintained within the confines of the helical conveyor as they are transferred downwardly.

The upper end of the helical conveyor 18 terminates adjacent the discharge end of a reciprocating conveyor unit 22 which is supported by vertically extending resilient support members 23 whereby the conveyor 22 is adapted to reciprocate toward and away from the helical conveyor 18. The reciprocating conveyor 22 is provided with a discharge spout 24 which is adapted to extend inwardly of the upper, receiving end of the helical conveyor 18, as shown in FIGS. 1 and 3. The conveyor unit 22 is reciprocated by suitable means, indicated generally at 25, in a manner well understood in the art whereby materials are continuously conveyed toward the discharge chute 24.

Mounted adjacent the upper end of the spiral conveyor 18 at a point outwardly and radially of the support member 16 are outwardly projecting members 26 having vertically aligned openings 27 therethrough for receiving a bolt 28. Extending between the outwardly projecting members 26 and pivotally connected thereto by the bolt 28 is one end of an arm 29. The other end of the arm 29 is pivotally connected by a pivot pin 31 to outwardly projecting members 32 carried by the reciprocating conveyor 22. It will thus be seen that upon reciprocation of the conveyor 22, the arm 29 is also reciprocated to thereby impart oscillatory motion to the helical conveyor 18 in a horizontal plane about a vertical axis. This oscillating motion of the helical conveyor 18 causes the materials carried by the spiral flight of the helical conveyor to move continuously downwardly toward the discharge or lower end of the helical conveyor.

As shown in FIG. 2, the lower, discharge end of the helical conveyor 18 is in position to discharge the materials onto the upper surface of an endless conveyor belt 33. Extending transversely beneath the upper flight of the endless conveyor belt 33 is a spiral spring member 34 which is in position to support the upper flight of the endless conveyor belt, as clearly shown in FIGS. 1 and 2. The ends of the spiral spring member 34 are supported by suitable brackets 36, as shown. By providing the resilient spring member 34 subjacent the discharge end of the helical conveyor 18 the materials dropped onto the endless conveyor belt 33 are cushioned whereby the materials are not damaged or broken in their transfer to the endless conveyor belt 33.

From the foregoing description, the operation of my improved apparatus for transferring materials from one elevation to a lower elevation will be readily understood. The materials, such as coal or the like, to be conveyed are continuously discharged into the upper end of the helical conveyor 18 by the discharge chute 24. Reciprocatory motion is continuously imparted to the conveyor unit 22 whereby the arm 29 is reciprocated to thus impart oscillating motion to the helical conveyor 18 about a vertical axis. The oscillating motion of the helical conveyor 18 causes the materials to be conveyed in a continuous and uniform manner from the upper end of the conveyor 18 to the lower end thereof whereupon the materials are continuously discharged onto the upper, moving flight of the endless belt 33. As the materials fall onto the moving conveyor 33, the resilient spring member 34 absorbs the impact of the materials onto the conveyor 33 whereby the materials are not damaged or broken.

From the foregoing, it will be seen that I have devised improved means for transferring materials from one elevation to a lower elevation. By providing means for operatively connecting the spiral conveyor to the reciprocating conveyor, oscillating motion is imparted to the helical conveyor thus providing a compact unit which requires a minimum of space for installation and at the same time eliminates the provision of separate means for oscillating the helical conveyor. Also, by operatively connecting the helical conveyor to the reciprocating conveyor, the helical conveyor is oscillated at the same magnitude as the reciprocating conveyor whereby continuous and uniform flow of the materials is obtained at all times. Furthermore, by providing the resilient means subjacent the discharge end of the helical conveyor for absorbing the impact of the materials onto the endless conveyor, the materials are handled in a gentle manner whereby there is no breakage thereof, thus particularly adapting the apparatus for conveying materials such as coal, since it is very desirable to prevent breakage of the coal into small particles as it is handled.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In apparatus for transferring materials from one elevation to a lower elevation, (a) a generally vertical support member mounted for oscillating movement about a vertical axis, (b) a vertically extending helical conveyor carried by said support member in position for the upper end of said helical conveyor to receive materials at said one elevation and for the lower end of said helical conveyor to discharge materials at said lower elevation, (c) a reciprocatory conveyor disposed to deliver materials to the upper end of said helical conveyor, (d) an arm operatively connected at one end to said helical conveyor outwardly and radially of the vertical axis about which said helical conveyor oscillates, (e) means operatively connecting the other end of said arm to said reciprocatory conveyor to impart reciprocatory motion to said helical conveyor in a horizontal plane about said vertical axis to convey materials down said helical conveyor to said lower elevation.

References Cited by the Examiner

UNITED STATES PATENTS

| | | | |
|---|---|---|---|
| 429,147 | 6/1890 | Mosher | 198—220 |
| 2,559,257 | 7/1951 | Obey | 198—106 |
| 2,613,802 | 10/1952 | Chapman | 198—192 |
| 2,972,197 | 2/1961 | Mickus | 198—220 |

FOREIGN PATENTS

| | | |
|---|---|---|
| 695,938 | 9/1940 | Germany. |
| 359,095 | 3/1961 | Switzerland. |

EVON C. BLUNK, *Primary Examiner.*

RICHARD E. AEGERTER, *Examiner.*